Figure 1:
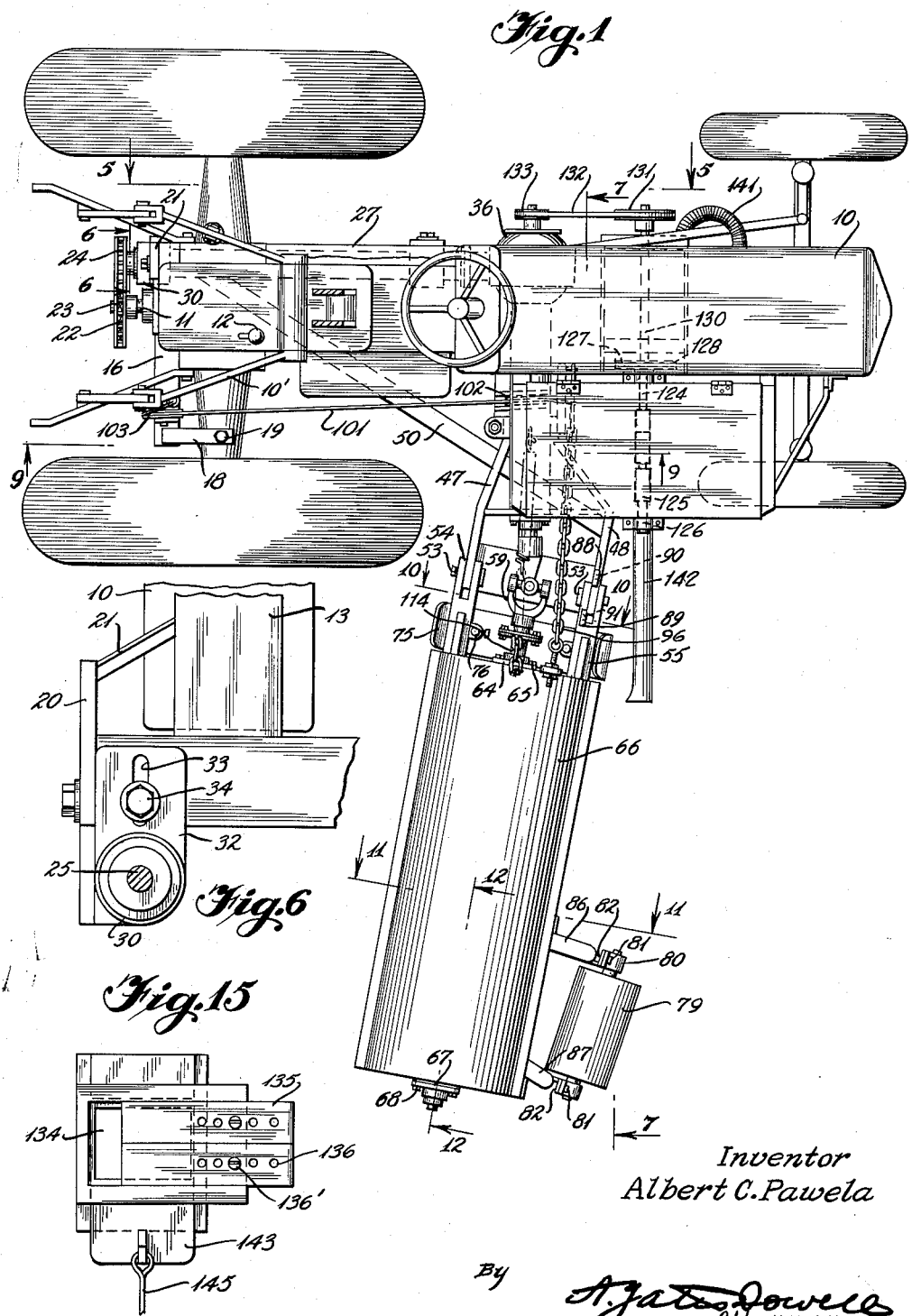

March 14, 1961    A. C. PAWELA    2,974,616
MOWER, CULTIVATOR AND FERTILIZER DISTRIBUTOR
Filed Oct. 2, 1959    4 Sheets-Sheet 1

Inventor
Albert C. Pawela

March 14, 1961 A. C. PAWELA 2,974,616
MOWER, CULTIVATOR AND FERTILIZER DISTRIBUTOR
Filed Oct. 2, 1959 4 Sheets-Sheet 2

Inventor
Albert C. Pawela

By A. Yates Dowell
Attorney

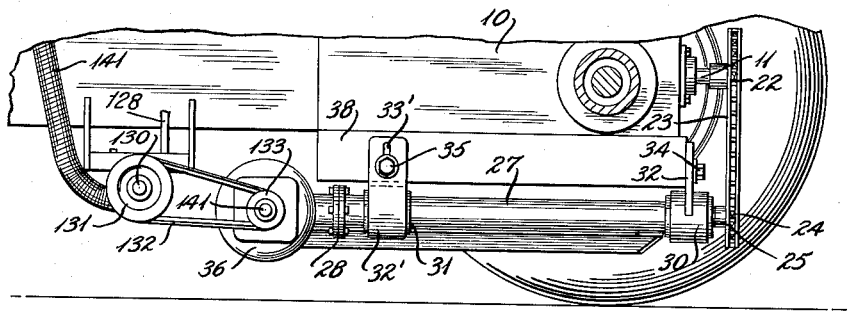

March 14, 1961     A. C. PAWELA     2,974,616
MOWER, CULTIVATOR AND FERTILIZER DISTRIBUTOR
Filed Oct. 2, 1959     4 Sheets-Sheet 4
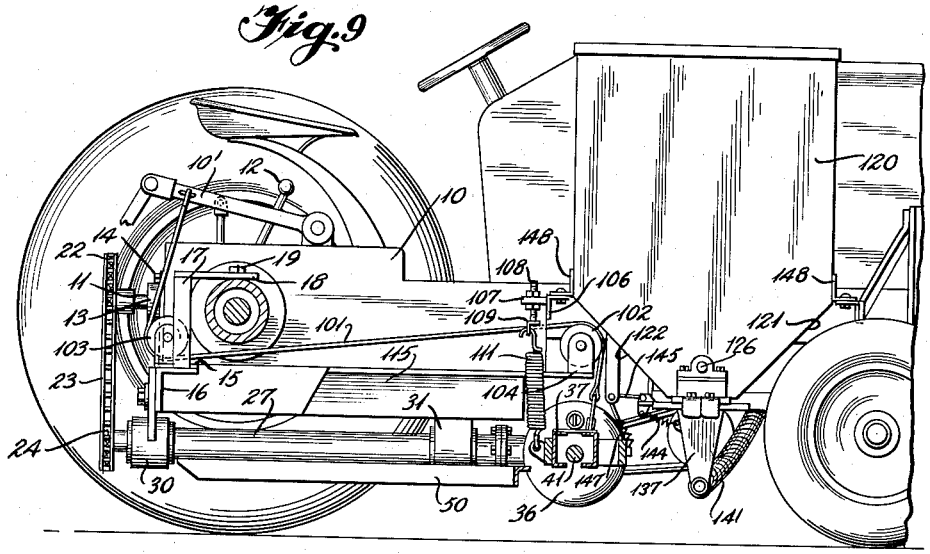
Inventor
Albert C. Pawela

United States Patent Office 2,974,616
Patented Mar. 14, 1961

2,974,616

MOWER, CULTIVATOR AND FERTILIZER DISTRIBUTOR

Albert C. Pawela, P.O. Box 1029, Eustis, Fla., assignor of one-half to Dillard Tractor Company, Inc., Eustis, Fla.

Filed Oct. 2, 1959, Ser. No. 843,962

8 Claims. (Cl. 111—11)

This invention relates to the treatment of the soil and vegetation thereon and to the equipment employed in such operations including the cutting of weeds and undesirable growth and the subsequent treatment thereof and the soil to promote selected growth and crop development.

The invention relates particularly to cultivators, fertilizer distributors, bankers or hillers, debankers, ringers and other implements or devices used in the care and cultivation of plant life, and which equipment is designed to enable the performance of maximum work with minimum personnel.

Efforts have been made to produce a hoe or cultivator which would effectively perform the services desired including the cutting and disposition of grass and the cultivation of the soil by mechanical means with a minimum of manpower. In the manufacture of prior devices great emphasis has been placed on speed of the operating parts as well as the vehicle and requiring that the structure be sufficiently large and strong and with maximum power for operating the same, all of which has resulted in excessive production costs.

It is an object of the invention to provide relatively simple and inexpensive cultivators or hoes, fertilizer distributors or other equipment of the character indicated applicable to a tractor or other vehicle having a power takeoff from which the device can be driven for accomplishing the desired result more economically, at low speed, and with the operating force distributed evenly over the entire operating period instead of periodically and with less vibration to the equipment.

Another object of the invention is to provide an implement which can be operated with less power constantly and uniformly supplied instead of an implement requiring a greater surge of power less frequency and which permits the utilization of smaller, less expensive parts, and which device is constructed to prevent the wrapping of grass around the same or to be self-cleaning and for sturdiness, and due to the slow speed of operation without the creation of dust or the danger of projecting or propelling objects with sufficient force to cause damage to person or property and eliminating the necessity for shields or guards for the cutters.

A further object of the invention is to provide a combination cultivator and fertilizer distributor by means of which a measured amount of fertilizer can be dispensed at a measured rate, and with the cultivator driven from the power takeoff of a tractor.

Figure 2:
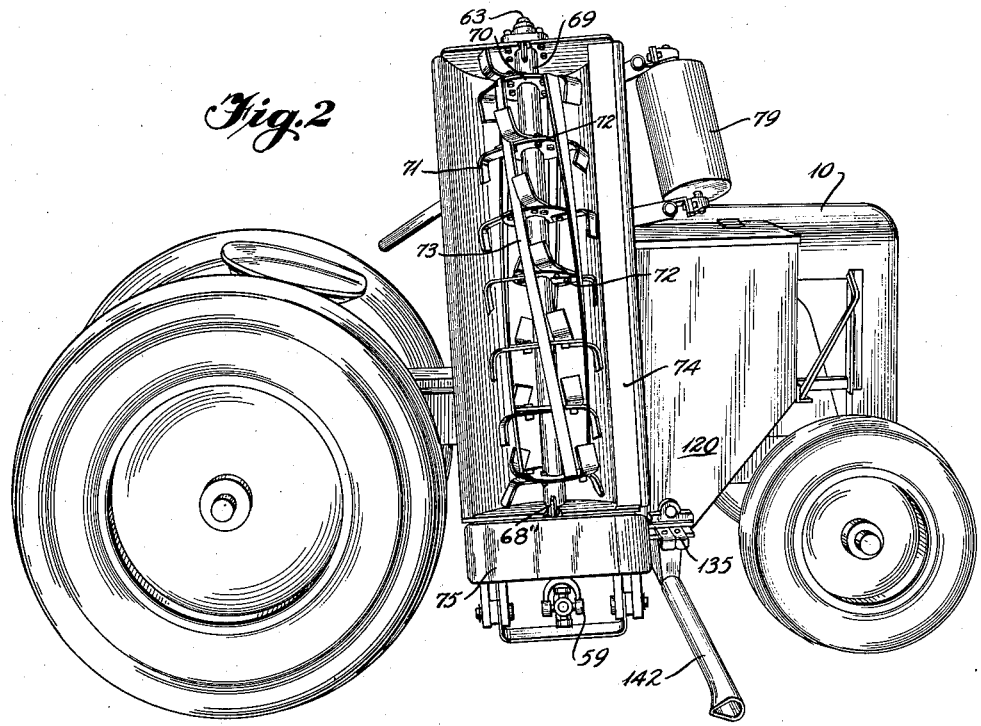
Figure 3:
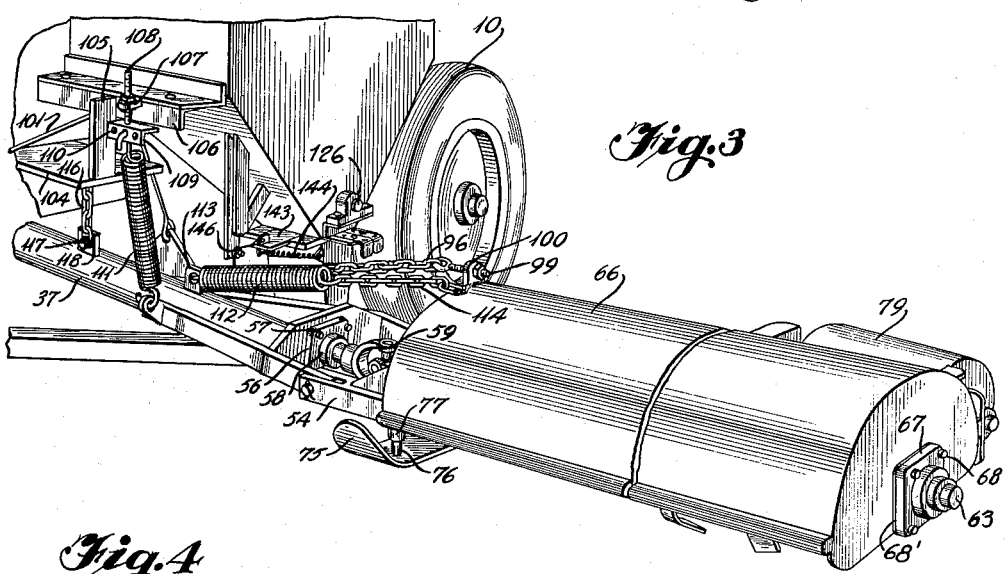
Figure 4:
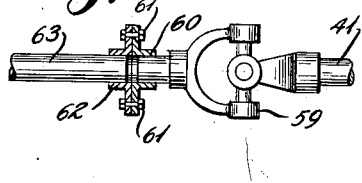

Other objects and advantages will be apparent from the following description taken in conjunction with the accompanying drawings, wherein:

Fig. 1 is a top plan view illustrating one application of the invention;

Fig. 2, a side elevation of the tractor with the cultivator or hoe elevated;

Fig. 3, an enlarged perspective of the cultivator or hoe and the fertilizer distributor;

Fig. 4, a side elevation of the universal joint and shear coupling of Fig. 3;

Fig. 5, a side elevation on the line 5—5 of Fig. 1 illustrating the drive of the power shaft from the power takeoff;

Fig. 6, a fragmentary detail of the mounting of the housing for the driveshaft of Fig. 5, as viewed on the line 6—6 of Fig. 1;

Fig. 7, a front elevation of the hoe or cultivator and fertilizer distributor;

Fig. 8, a substantially horizontal section through the right angular drive between the power takeoff and the cultivator or hoe;

Fig. 9, a side elevation of a tractor equipped with both cultivator and fertilizer distributor energized from the internal combustion engine of the tractor, as viewed on the line 9—9 of Fig. 1;

Fig. 10, a transverse section on the line 10—10 of Fig. 1;

Fig. 11, a transverse section on the line 11—11 of Fig. 1;

Fig. 12, a fragmentary detail on the line 12—12 of Fig. 1;

Fig. 13, a side elevation of the lower end of the fertilizer distributor;

Fig. 14, a section on the line 14—14 of Fig. 13 illustrating the drive for the fertilizer agitator; and Fig. 15, a section on the line 15—15 of Fig. 14.

Briefly stated, the invention is an implement such as, for example, a cultivator or hoe and a fertilizer distributor, both of which are applicable to a tractor, so that both the cultivator and the distributor can be used simultaneously, with the distributor in the form of a hopper or container having an inclined and flattened discharge and extending at an angle through a slot into a pipe through which pressure is supplied from the exhaust or other source, and which discharge pipe is connected to the cultivator so that when the fertilizer is discharged it can be worked into the soil. The sweep or angle of the fertilizer distributor prevents back pressure or blowback of the fertilizer discharged. The cultivator includes a rotatable cutter comprising spaced spirally disposed blades driven counter to the direction of movement of the vehicle at a low rate of speed which will produce minimum dust and with diagonal braces lengthwise of the rotatable cutter, which braces strengthen the structure and render the same self-cleaning by preventing the wrapping of grass or the like around the cutting mechanism. The cultivator is provided with a skid at its inner end and with a roller angularly disposed and adjustable as to height in front of the outer or remote portion of the cutter, such angular disposition and elevational adjustment maintaining the cutter in the proper relation. The cutter is driven from the power takeoff of the tractor with a shear connection to prevent damage when an obstruction is encountered.

With continued reference to the drawings, a tractor 10, of conventional construction, has a power drive including a shaft 11 extending from its rear and from which shaft various devices may be driven. The operation of the shaft 11 is controlled through a clutch of known construction by a lever 12.

An upright plate or arm 13 is mounted about the end of the power takeoff by bolts 14, and to the lower end of such plate is attached a horizontal plate or shelf member 15 which supports a transverse angle bar 16 to the end of which adjacent the right-hand side of the tractor is attached an upright post 17 topped with a horizontal plate or cap 18, secured by a bolt 19 to the tractor rear axle housing adjacent the wheel at the right-hand side thereof.

The opposite or left-hand end of the angle bar 16 is provided with a mounting plate 20 across the end thereof in vertical position to the angle bar 16, such plate being welded to the end of the angle bar and having an angular bracket 21 connecting the upper rear corner of the same with the upper side edge of the plate 13 to increase the rigidity of the structure.

On the power takeoff shaft 11 is mounted a sprocket 22 having a known taper lock hub, which sprocket drives through a chain 23 a smaller sprocket 24 fixed to the rear end of a forwardly extending drive-shaft 25. The drive-shaft 25 is supported by spaced bearings 26 and is contained within a housing 27 with a coupling 28 for assembly purposes, such drive-shaft housing 27 corresponding to that of a conventional automobile drive-shaft housing and being pivotally supported within a pair of spaced bearing sleeves 30 and 31 near the rear and forward ends of the housing. The sleeve 30 is attached (Figs. 1 and 6) to an upright plate 32 having a slot 33 therein for receiving a bolt 34 and such plate is located at the rear end of the housing which extends through the mounting plate 20 at the end of the angular bracket 21. The sleeve 31 (Fig. 5) is mounted on a plate 32' having a slot 33' therein for receiving a bolt 35 at the forward end of the drive-shaft housing and the plate 32' is adjustably mounted on a bracket 38 attached to the tractor. The two bolts 34 and 35 can be loosened to vary the elevation and angularity of the drive-shaft housing. The forward end of the drive-shaft housing 27 (Figs. 5 and 8) is connected to a gearbox or housing 36, which in turn is connected to a shaft housing 37 extending at right angles to the housing 27.

The drive-shaft 25 carries a bevel gear 39 within the housing 36 and such bevel gear engages a cooperating bevel gear 40 on a shaft 41 within the housing 36 and carried by spaced bearings 42 and 43 on opposite sides of the housing 36.

The opposite end of the shaft 41, at the right hand side of the vehicle, is mounted in a bearing 44 carried by a cross plate 45 welded to the housing 37. The plate 45 has short and long ends, the short end being attached to a shorter side bar 47 and the long end being connected to a longer side bar 48, such side bars having rear ends converging to contact the housing 37 and being secured thereto by welds 49.

An angular supplemental brace 50, which may be L-shape in cross-section for strength, is welded or otherwise secured to the bar 48 adjacent to the junction of the same with the plate 45 and to the bar 47 near the rear or end of the same adjacent the housing 37. The opposite end of the brace 50 is welded or otherwise secured to the drive-shaft housing so that it and the housing 37 with the shaft 41 and the brace 50 as a unit can be moved about the axis of the drive-shaft 25.

The forward ends of the bars 47 and 48 are provided with pivot openings 51 and 52 (Fig. 8) for the reception of pivot pins 53 to support a cutter bar or operating unit having bifurcated ends 54 and 55. The opearting unit is driven from the shaft 41, supported by the bearing 44 and by means of a bearing 56 fastened by bolts 57 to the cross-plate 45. The bearing 56 has a set collar 58 which fastens the bearing to the shaft so that the bearing will retain its mounting.

The shaft 41 is connected to the operating unit by a universal joint 59 (Fig. 4) and a shear coupling plate 60 welded thereto and adapted to be attached by pins or bolts 61 to a cooperating shear coupling plate 62 mounted on the operating unit or implement shaft 63. The implement shaft is mounted in a bearing 64 (Fig. 1) secured by bolts 65 to a substantially semi-cylindrical housing or cover member 66 in which the cultivator or other implement is contained. The opposite end of the shaft 63 is mounted in a bearing 67 attached to the opposite end of the semi-cylindrical housing 66 by means of the bolts 68. A plate 68' carrying a relatively flat piece of metal forming a weed cutter 68" is attached by the bolts 68, such weed cutter due to its fixed mounting preventing the accumulation of weeds and grass which otherwise would tend to wrap around the end of the cutter shaft 69 and exert pressure against the end of the housing or cover member 66.

The shaft 63 is received within and welded to a double strength tube or pipe 69 (Fig. 2) so that there is a small space between the pipe and the shaft to prevent warping of the shaft when the pipe is subjected to welding heat. Circular plates or rings 70 are welded or otherwise secured in spaced relation along the tube 69, such rings having generally L-shape blades 71 fastened thereto by bolts 72 (Fig. 2) the blades being set in spiral around the tube 69 to cause gradual engagement of the edges thereof with the material being cut thereby effecting a smooth operation and not subjecting the device to a single substantial shock of impact but to a series of continuous relatively small shocks.

The blades 71 have their forward portions tapered to provide relatively thin cutting edges, such cutting edges being along a portion of the blades substantially at right angles to the shaft and around the bend and along the portion substantially parallel to the shaft. Also, the mounting disks or rings 70 are provided with angular braces 73, of which there may be four in number, which add rigidity to the cutting unit, and prevent wrapping of the material cut around the tube 69.

In operation the rotation of the cutting unit is in a direction counter to the direction of rotation of the wheels of the tractor during the forward movement of the tractor. Further, the relation of the parts which form the drive for the implement is such that the rotation of the cutter mechanism is relatively slow, for example, approximately 150 r.p.m.'s.

Within the housing for the cutter unit along the forward edge is mounted a shear bar 74 welded lengthwise and at its ends to such housing to chop weeds and tall grass and to provide additional rigidity to the housing. The housing is provided adjacent its inner end with an adjustable skid 75 having upright mounting posts 76 extending through sleeves 77 attached to the bifurcated members 54 and 55 and adjustably secured in position by set screws 78. This skid permits the inner end of the tractor bar to follow the contour of the terrain regardless of the position of the outer end thereof. In order to limit such outer end from lowering excessively a roller 79 is mounted in bearings 80 secured by bolts 81 to brackets 82 having sleeves 83 in which mounting rods 84 are held adjustably by means of set screws 85, such rods being carried by long and short brackets 86 and 87 welded or otherwise secured to the outer end of the implement housing. Such roller provides a depth gauge for the implement. The roller is at an angle to prevent the outer end of the implement from digging or penetrating too deeply in the earth or in the growth being cut and to counteract the normal tendency of the implement to move inwardly due to the action of the blades.

The universal joint 59 is in line with the pivots 53 mounting the cutter bar so that the latter can be raised and lowered and maintained in elevated position during transportation. Safety bars 88 and 89 are secured respectively on the bar 48 and on the bifurcated end 55 of the operating unit said safety bars having openings 90 and 91 adapted to be brought into alignment when the implement is in upright position and to receive a bolt or pin therethrough to prevent accidental falling of the implement.

In order to raise and lower the implement, means is provided for raising and lowering the end of the shaft housing 37 carrying the bearing 44 and this is accomplished by means of a generally triangular connector 93 which is pivotally mounted by a bolt 94 at one corner to a lug 95 on the shaft housing 37. A chain 96 is connected at one end to an opening 97 in the connector 93 and the opposite end is adjustably connected by means of a threaded bolt and nut 98 through a bracket 99 on the housing for the implement. A third opening 100 is provided in the connector 93 in which is attached a cable 101 which extends over a pair of sheave wheels 102 and 103 mounted respectively on brackets 104 and 16 and connected to one of the hydraulic lift-arms 10' of the tractor so that when the lift-arm is oscillated the bracket 93 will be rotated about its pivot member 94 and the fixed member 95 to cause tightening of the chain 96 and elevating the outer end of the unit after which the entire unit will be elevated.

The bracket 104 is provided with an upstanding arm 105, preferably L-shape or of other cross-section for strength, and having a top horizontal or shelf portion 106 with a lug 107 with an opening therethrough in which is received a threaded shank 108 with nuts on opposite sides of said shelf and adjustable therealong for securing said threaded shank in adjusted position. The lower end of the threaded shank 108 has attached thereto the horizontal portion of an L-shape bracket 109 having in its depending portion one or more openings 110 in which one or more coil springs 111 are engaged. The lower ends of these springs engage openings in lugs carried by the bar 47 and the angle member 50 for resiliently supporting the same and the housing 37 and associated parts.

In view of the fact that the outer end of the cutter bar tends to overbalance the inner end, one or more balancing springs 112 are provided attached to shaft housing 37 by means of perforated plates 113 and with the other ends of the springs adapted to be disposed within the links of one or more chains 114 welded to the implement housing. The tension on the springs can be varied by the engagement of the springs in the different links of the chains.

The bracket 104 is provided with an angular support 115 which attaches to the tractor rear axle housing in order to withstand the force of the elevating cable on the rear pulley. Depending from the bracket 104 is a chain 116 adapted to be connected by a bolt 117 with an upstanding perforated lug 118 attached to the tube 37 to hold the tube with the implement and associated mechanism in elevated position during transportation or when not in use.

In view of the fact that the power takeoff operates in a clockwise direction as viewed from the rear of the tractor the drive shaft 25 is rotated similarly by the chain 23. The bevel gear 39 on the end of the shaft 25 will mesh with the bevel gear 40 on the shaft 41 and cause such shaft and the implement driven thereby to rotate in a direction opposite to the direction of travel of the tractor, with the lower portion of the cultivator or implement rotated in a manner which normally would cause it to travel rearwardly while the tractor travels forwardly.

The fertilizer distributor (Figs. 1, 2, 3, 9, 13 and 14) is a rectangular box or hopper with the front 120 and two sides 121 and 122 convergingly tapered to a relatively small 6" square opening 123 at the bottom. The hopper has a capacity of about 8 cubic feet and from front to back through its bottom there extends a shaft 124 having spaced agitator blades 125. These blades operate slowly at about 40 or 50 r.p.m's and keep the fertilizer in free flowing condition or from becoming hard and pasty. The blades 125 are welded to a sleeve 126 pinned to the shaft 124 for easy removal of the shaft with the blades. Rotation of the shaft 124 is caused by a belt pulley 127 driven by a belt 128 from another pulley 129 on a jack shaft 130 which has another pulley 131 mounted thereon driven by a belt 132 from a pulley 133 on the main drive of the shaft 41 extending through the gear box 36. In the bottom of the hopper there is an opening 134 (Fig. 14). Over this opening is placed a slide gate 135 with openings 136 to receive retaining screws 136' to provide a control valve system to regulate the amount of fertilizer distributed. Beneath the opening and welded to the bottom of the hopper is a wedge-shape funnel 137 and the flattened bottom end 138 of this funnel extends into a slot 139 in a 1½" tube or pipe 140 about 8" long to which the funnel is welded so that fertilizer falling into the pipe through the slot can be carried out by the exhaust gas of the tractor. The discharge funnel is inclined in the direction of flow so that there is no back pressure. This is an important feature and determines the success or failure of the invention. This pipe is connected to the exhaust system of the tractor by means of a flexible tube 141 and the exhaust pressure is utilized to blow the fertilizer through a tube 142 into the path of the cultivator where it will be worked into the soil by the blades thereof.

There are two separate control gates or gauges (Figs. 14 and 15) one 135 next to the opening or near the cutters constituting the slide poundage regulating gate, by which the desired weight of fertilizer can be controlled, ordinarily from about one-half pound to eight pounds per tree. Underneath the gate 135 is the cut-off gate or valve 143 loaded by a spring 144, see Figs. 3, 9 and 13, to stay closed at all times until the hoe head is lowered to start cultivating.

The cut-off gate 143 opens and closes automatically as the hoe is raised or lowered when passing from tree to tree. To open the gate, a small cable 145 (Figs. 3 and 9) is attached thereto which extends about a pulley 146 and is attached to the housing 37 to which the cultivator is connected so that when the cultivator is lowered, the cable will open the gate. A spring 147 forming an extension of the cable is provided so that if the lowering of the tube is excessive there will not be breakage.

The hopper is mounted on the right side of the tractor between the front and rear wheels, and mounting brackets 148 attach it to the side of the tractor frame.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. The combination of a wheel equipped tractor having a power takeoff and movable lift arms, a cultivator unit including a hood provided with end walls, means for mounting said cultivator unit on said tractor, said cultivator unit comprising shaft means rotatably mounted on said hood end walls, drive means operatively connecting said shaft means to said power takeoff for driving said shaft means in a direction reverse to the direction of rotation of the tractor wheels and at a relatively low speed, mounting members secured in axially spaced relation along said shaft means, earth cutting blade members fastened to said mounting members and arranged in spiral relation along said shaft means to effect a gradual engagement with the earth, a shear bar, means mounting said shear bar on said hood at substantially the elevation of said shaft means and in fixed cooperative relation to the cutting edges of said earth cutting blade members to effect cutting of vegetation, weed cutter bar means fixedly mounted on said hood end walls disposed in cooperative relation with adjacent endmost earth cutting blade members on said shaft means to prevent the wrapping of weeds around the ends thereof, and means connecting said movable lift arms to said cultivator unit mounting means for raising or lowering the same.

2. The structure of claim 1, including a fertilizer distributor mounted on said tractor, agitating and feed means therein for discharging a measured quantity of fertilizer at a measured rate forwardly of and in the path of said cultivator unit, drive means operatively connecting the agitating and feed means to said tractor power takeoff, means connecting said feed means to said cultivator unit mounting means for automatically opening said feed means on lowering of said cultivator unit mounting means, and separate means connected to said feed means for automatically closing the same when said cultivator unit mounting means is raised.

3. The structure of claim 1 and safety holding means on said cultivator unit and said means for mounting the same arranged to be locked together when said cultivator unit is in raised inoperative position.

4. The structure of claim 1 in which said cutting blades are each L-shaped with one portion of the cutting blades radially secured to the mounting members and the other portion of the cutting blades extending generally parallel to the axis of the shaft, and spirally arranged growth anti-wrap bars secured to said mounting members and radially spaced from and extending lengthwise of said shaft and disposed between said spirally arranged cutting blades.

5. The structure of claim 1, said means for mounting the cultivator unit positioning the same laterally of the tractor with the hood lying substantially transverse to the longitudinal plane of the tractor, and an angularly disposed roller mounted on said hood forwardly thereof and adjacent its outermost end for counteracting the tendency of the cutting blades to move in a given direction and from digging or penetrating too deeply.

6. The structure of claim 5 and an adjustable skid mounted on said cultivator unit mounting means adjacent the innermost end of said hood to provide for the cultivator unit mounting means following the contour of the ground.

7. A cultivator unit including a hood having end walls, means for mounting said cultivator unit on a tractor, said cultivator unit comprising shaft means rotatably mounted on said hood end walls, drive means on said cultivator unit mounting means for operatively connecting said shaft means to a source of power for driving said shaft means in a reverse rotational direction with relation to the forward movement of said cultivator unit and at a relatively low speed earth cutting blade members fastened in axially spaced spiral relation along said shaft means to effect a gradual engagement with the earth, a shear bar, means mounting said shear bar on said hood at substantially the elevation of said shaft means and in fixed cooperative relation to the cutting edges of said earth cutting blade members to effect cutting of vegetation, weed cutter bar means fixedly mounted on said hood end walls disposed in cooperative relation with adjacent endmost earth cutting blade members on said shaft means to prevent the wrapping of weeds around the ends thereof.

8. The structure of claim 7 in which said shaft means includes a shaft, a tube surrounding said shaft having an internal diameter slightly larger than the diameter of said shaft, and means fixedly securing said tube to said shaft for rotation therewith.

References Cited in the file of this patent

UNITED STATES PATENTS

| 221,640 | Whitcomb | Nov. 11, 1879 |
| 1,354,570 | Lamping | Oct. 5, 1920 |
| 1,415,663 | Lilleberg | May 9, 1922 |
| 1,703,308 | Johnson | Feb. 26, 1929 |
| 1,768,581 | Doolan | July 1, 1930 |
| 1,912,706 | Goodman | June 6, 1933 |
| 2,151,918 | Ingram | Mar. 28, 1939 |
| 2,552,710 | Dodson | May 15, 1951 |
| 2,585,296 | Bennett | Feb. 12, 1952 |
| 2,761,300 | Gredell | Sept. 4, 1956 |
| 2,771,829 | Sahlbom | Nov. 27, 1956 |
| 2,854,172 | Buhr | Sept. 30, 1958 |
| 2,865,160 | Farwell | Dec. 23, 1958 |
| 2,871,804 | Pounds | Feb. 3, 1959 |

FOREIGN PATENTS

| 880,814 | Germany | June 25, 1953 |
| 769,309 | Great Britain | Mar. 6, 1957 |